(12) United States Patent  (10) Patent No.: US 7,762,387 B2
Dunn  (45) Date of Patent: Jul. 27, 2010

(54) CONVEYOR IDLER ASSEMBLY

(76) Inventor: Leslie Donald Dunn, 45 Burn Street, Capella, Queensland (AU) 4723

( * ) Notice: Subject to any disclaimer, the term of this patent is extended or adjusted under 35 U.S.C. 154(b) by 114 days.

(21) Appl. No.: 12/295,367

(22) PCT Filed: Mar. 30, 2007

(86) PCT No.: PCT/AU2007/000406

§ 371 (c)(1),
(2), (4) Date: Sep. 30, 2008

(87) PCT Pub. No.: WO2007/112484

PCT Pub. Date: Oct. 11, 2007

(65) Prior Publication Data

US 2009/0260956 A1   Oct. 22, 2009

(30) Foreign Application Priority Data

Mar. 31, 2006  (AU) ............................. 2006901674
Nov. 3, 2006  (AU) ............................. 2006906126

(51) Int. Cl.
*B65G 15/08* (2006.01)
(52) U.S. Cl. .................... 198/823; 198/825
(58) Field of Classification Search ............ 198/820, 198/823, 825, 826
See application file for complete search history.

(56) References Cited

U.S. PATENT DOCUMENTS

| | | | |
|---|---|---|---|
| 1,422,662 A * | 7/1922 | Bylger ................. | 198/825 |
| 3,430,755 A | 3/1969 | Allendorf | |
| 4,513,859 A | 4/1985 | Long | |
| 4,932,516 A * | 6/1990 | Andersson ............. | 198/823 |
| 5,038,924 A * | 8/1991 | Stoll .................... | 198/823 |
| 5,341,921 A * | 8/1994 | Kokolis ................ | 198/825 |
| 5,657,857 A | 8/1997 | Neilson | |
| 5,988,361 A * | 11/1999 | Giacomin et al. ...... | 198/830 |
| 6,427,828 B1 * | 8/2002 | East et al. ............ | 198/826 |
| 7,621,391 B2 * | 11/2009 | Matters et al. ........ | 198/825 |
| 2004/0079621 A1 | 4/2004 | Mott | |

FOREIGN PATENT DOCUMENTS

| | | |
|---|---|---|
| GB | 2207408 | 2/1989 |
| GB | 2318108 | 4/1998 |
| JP | 8225136 | 9/1996 |
| JP | 9-188412 | 7/1997 |
| JP | 2005-194067 | 7/2005 |
| SU | 430015 | 9/1976 |
| SU | 1619621 | 10/1996 |
| WO | WO 82/02374 | 7/1982 |
| WO | WO 2006/060862 | 6/2006 |

OTHER PUBLICATIONS

DL 126698, Aug. 3, 1977, Buchholz.

* cited by examiner

*Primary Examiner*—James R Bidwell
(74) *Attorney, Agent, or Firm*—Kang Intellectual Property Law, LLC; Grant D. Kang

(57) ABSTRACT

A conveyor idler assembly (10) for supporting a conveyor belt (11) comprising a support frame (12) having at least one elongated linear or longitudinally curved support beam (16) which extends transversely of the conveyor belt (11) and at least one idler cassette (13) having an idler roller (30), the cassette (13) being mounted to the support beam (16) for slidable movement therealong.

20 Claims, 7 Drawing Sheets

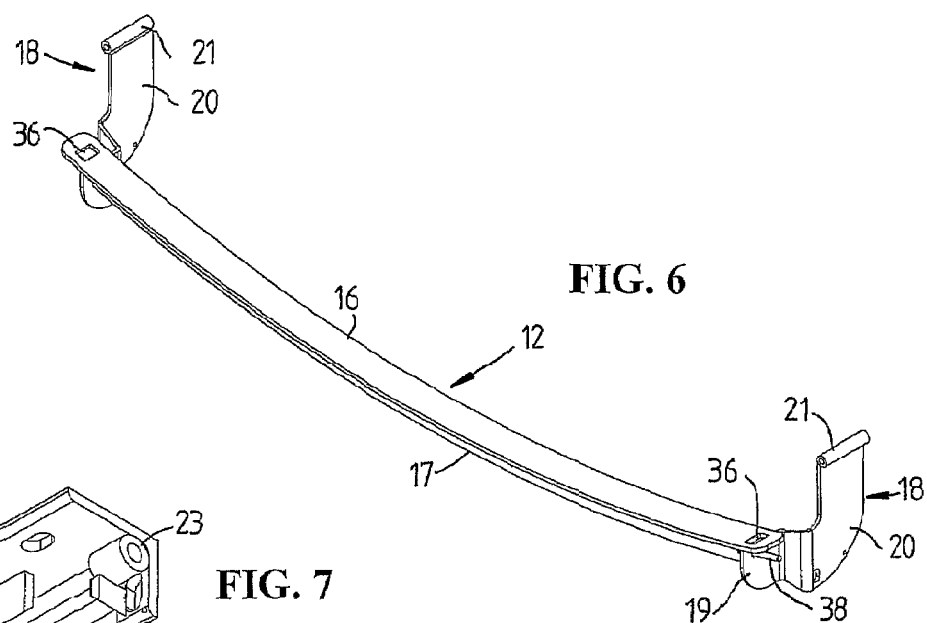
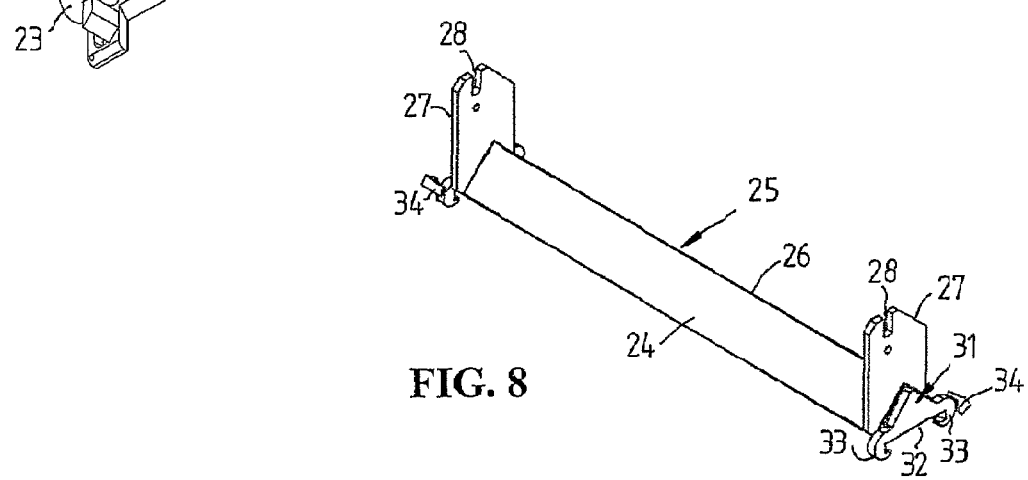
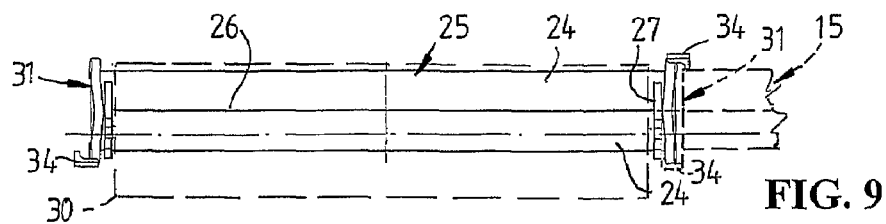
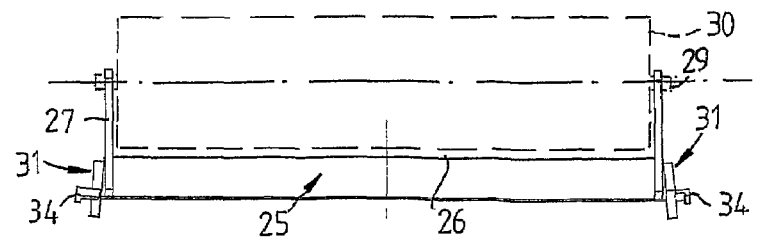

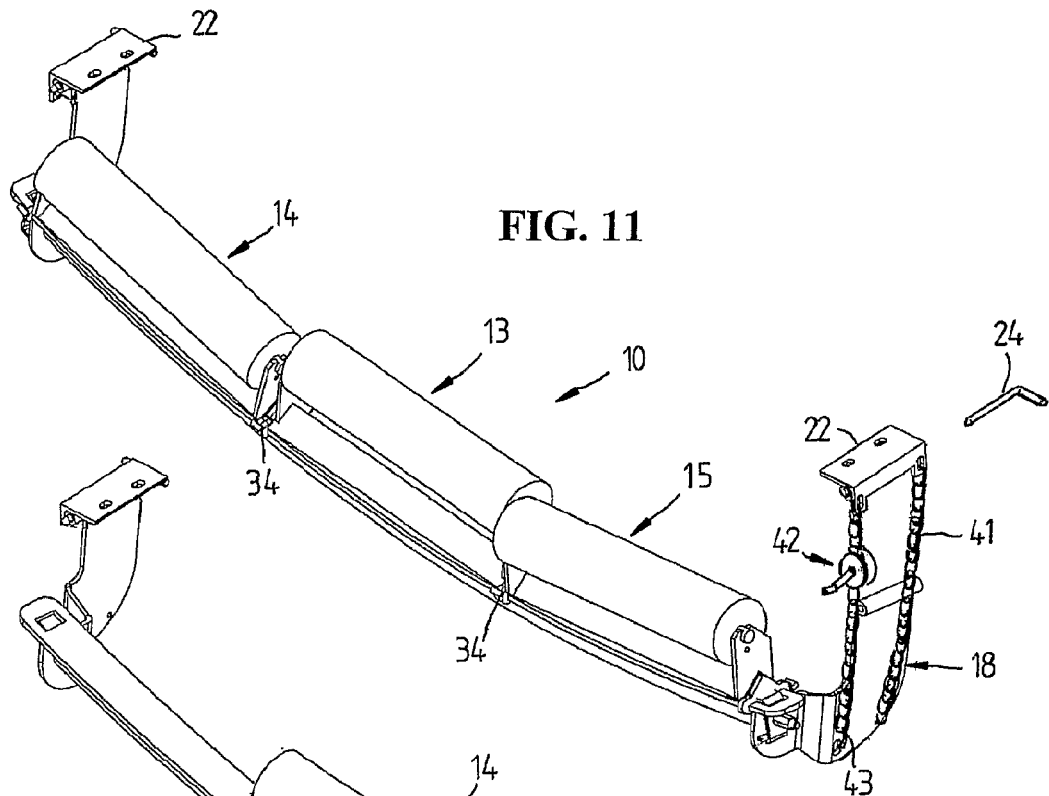
FIG. 11
FIG. 12
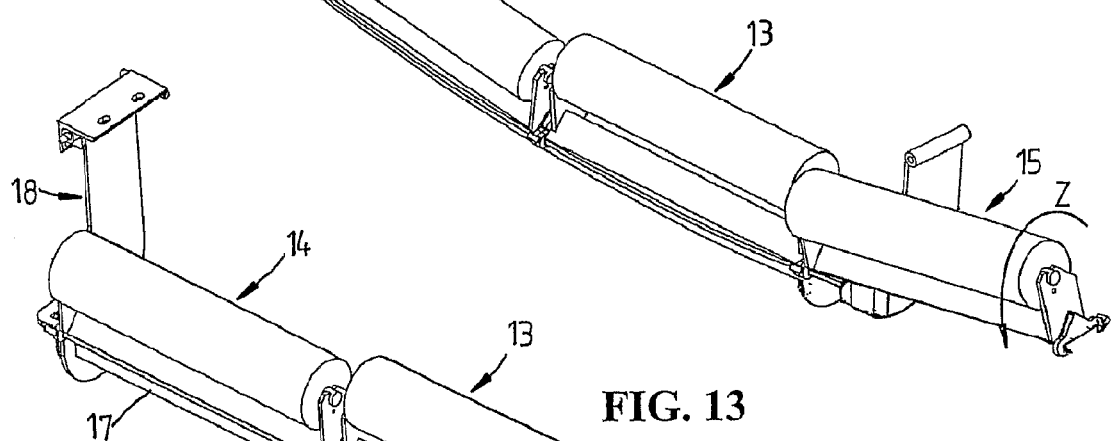
FIG. 13
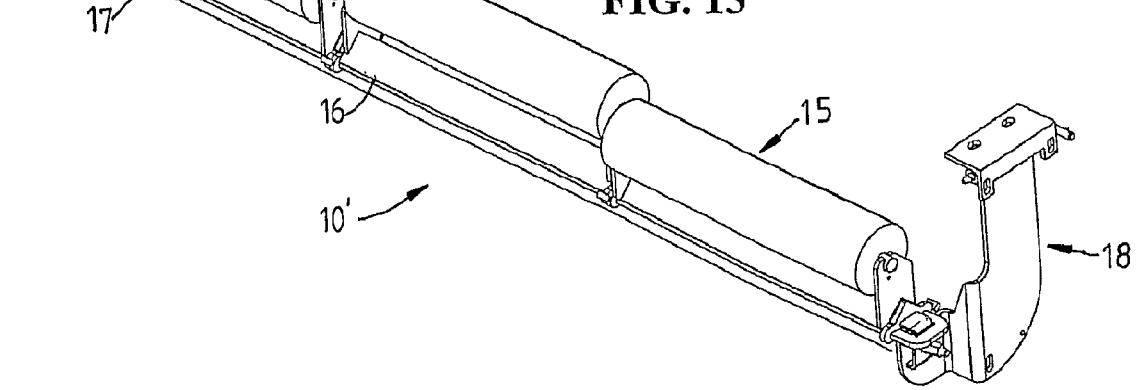

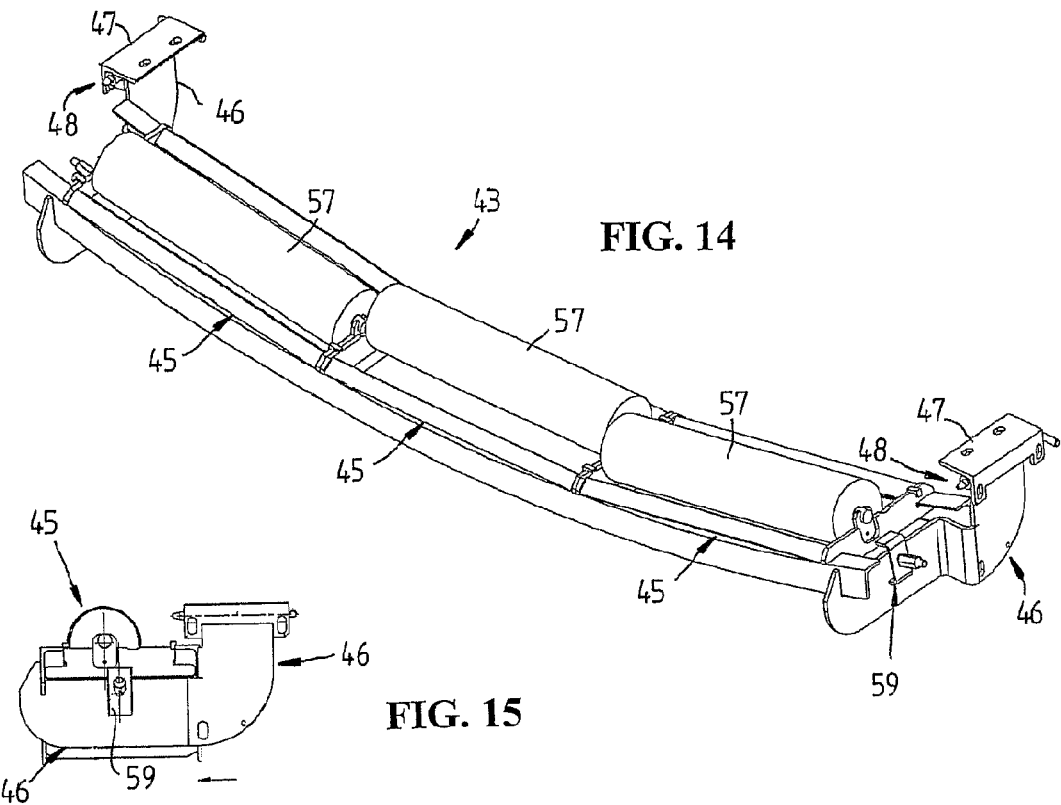
FIG. 14
FIG. 15
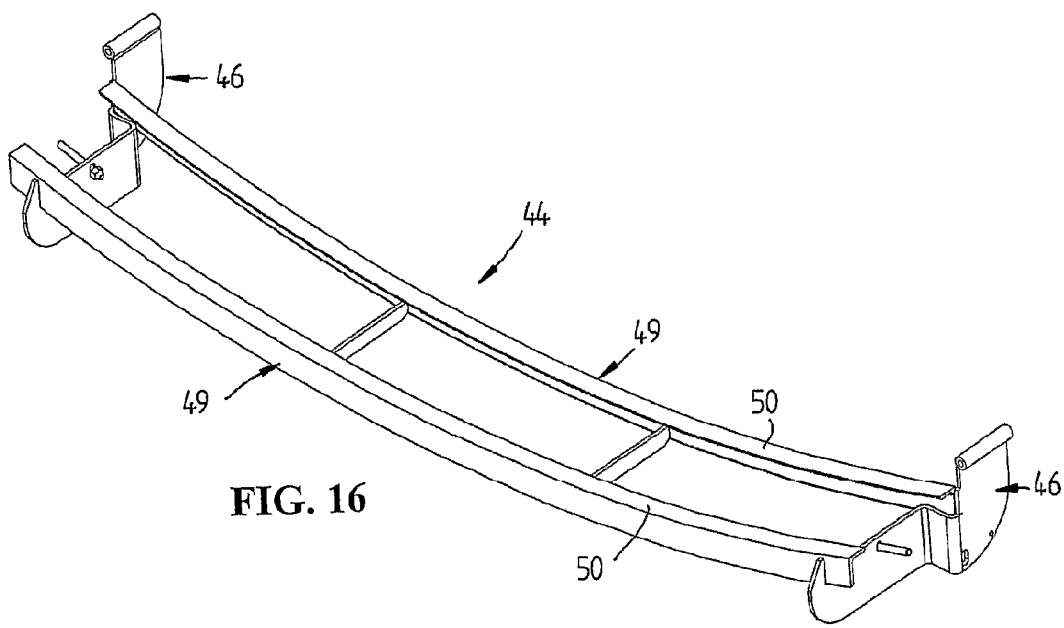
FIG. 16

CONVEYOR IDLER ASSEMBLY

CROSS-REFERENCE TO RELATED APPLICATIONS

This application claims priority to PCT/AU2007/000406 filed on Mar. 30, 2007; which claims priority to Australian Patent Application No. 2006901674, filed Mar. 31, 2006; which claims priority to Australian Patent Application No. 2006906126, filed Nov. 3, 2006.

TECHNICAL FIELD

This invention relates to a conveyor idler assembly and in particular to a conveyor idler assembly for use with belt conveyors typically but not exclusively used for conveying particulate materials in the mining industry.

BACKGROUND ART

Belt conveyors are commonly used in the mining industry for conveying particulate material such as mined materials for example coal or ore. Conveyors of this type include a moving belt for carrying the material to be conveyed supported on a plurality of sets of conveyor idler rollers. The conveyor idler roller sets usually include two or more idler rollers arranged in an end-to-end relationship. In one particular arrangement, the conveyor idler roller sets include a central roller and side rollers on opposite sides of the central roller. The conveyor idler sets further include a support frame provided with spaced notched brackets or lugs to receive the opposite ends of axles of the idler rollers. The brackets may be configured to support the rollers at an obtuse angle relative to each other or where there is a central roller and opposite side rollers, the side rollers at an obtuse angle to the central roller so that the belt supported on the rollers forms a concave dish-shape in cross section. Some conveyor idler sets have provision to vary the angle between the respective rollers by providing a plurality of mounting points for the roller axles. The rollers thus may be adjusted between one position in which they are axially aligned and in which the belt supported thereon is substantially planar to other positions where the rollers are inclined such that a belt supported thereon has the concave dish- or trough-like configuration.

Removal of an idler from the conveyor idler roller sets of the above described type for replacement or service presents a number of difficulties. In many cases, it is necessary to stop the operation of the conveyor so that access can be had to the conveyor idler sets. Furthermore, idler replacement on idler sets at elevated locations usually requires a workman to wear a safety harness and may require more than one person to work on the idler set during this procedure. Furthermore, on ground mounted structures, a workman is required to lie under the return line of the conveyor belting which is not desirable from the point of health and safety requirements or legislation. A workman may also be required to lie inside the conveyor structure to replace the central idler rollers which can also be unsafe.

SUMMARY OF THE INVENTION

The present invention aims to provide an improved conveyor idler assembly which overcomes or alleviates the above disadvantages or which at least provides an effective alternative to the known conveyor idler assemblies. The present invention in a further aspect aims to provide a conveyor assembly having a series of conveyor idler assemblies. The present invention in yet a further aspect provides a support frame for idler roller cassettes of a conveyor idler assembly. Other objects and advantages of the invention will become apparent from the following description.

The present invention thus provides in one preferred aspect a conveyor idler assembly comprising a support frame, said support frame including at least one elongated linear or longitudinally curved support beam, and at least one idler cassette, each said idler cassette including a cradle and an idler roller rotatably supported on said cradle, said cradle being mounted for to said support beam for slidable movement therealong.

When the cradle is mounted to the support beam, the roller supported on the cradle extends longitudinally relative to the support beam.

Preferably the cradle is captured to the support beam and is adapted to be installed endwise onto, or removed endwise from, an end of said support beam. The cradle suitably includes longitudinally spaced beam engagement means preferably at opposite ends of the cradle which capture the cradle and thus the cassette to the beam and permit longitudinal sliding movement of the cradle relative to the beam. The cradle when captured to a curved beam extends in a chordal direction relative to the beam between the opposite end beam engagement means. In one arrangement each beam engagement means includes a re-entrant recess for receiving and capturing the beam. Each beam engagement means may comprise a C-shaped bracket which defines the re-entrant recess and which has inwardly oppositely directed fingers which can locate on the underside of the beam.

The cradle may comprise a main elongated support member and end mounts for receiving opposite ends of a shaft or spindle of the idler roller. Retainers may be provided to retain the shaft or spindle to the end mounts. The main elongated support member suitably comprises a member of V-shaped cross section such as an angle member with the apex of the V uppermost and located adjacent the roller. The V-shaped member has opposite side flanges to act as deflectors for materials spilling from a conveyor belt.

The main support members of adjacent cassettes may have their adjacent ends or beam engagement brackets thereof in substantial abutment when supported on the beam to prevent ingress of debris and build-up of material between adjacent cassettes. The ends or brackets of the main support member may be angled to enable abutment therebetween.

The beam may comprise a thin elongated rail whose width is substantially greater than its thickness so that it is of strip-like form and elongated stiffening means are provided for stiffening the rail. The elongated stiffening means may comprise a rib on the upper or lower side of the rail. The rib may be arranged centrally of the rail and extend at right angles thereto so that the support beam is of a T-shaped or inverted T-shaped configuration. The beam may be constructed of steel and may be curved or be linear.

In another arrangement, the least one support beam comprises a pair of spaced parallel rails. The cradle in this arrangement suitably includes end cradle members, and a shaft or spindle of the roller is supported at opposite ends to the end cradle members respectively. The end cradle members may have means such as slots on opposite sides adapted to cooperate with the spaced rails respectively to capture the cradle to the rails for slidable movement therealong.

Preferably the cradle has a central longitudinal axis and the roller is offset from the central axis. The roller may be offset to one side of the support beam. Respective cassettes may be adapted to be mounted on the support beam such that a roller of one cassette is offset from, or aligned with, a roller of a further cassette supported on the beam. Cassettes for this purpose may be simply reversed in orientation before placement on the support beam.

The cassettes suitably includes latching means adapted to releasably interconnect the cradle of one cassette to the cradle of an adjacent cassette whereby a plurality of interconnected cassettes on the support beam can be moved together along the support beam which facilitates disengagement of the cassettes from one end of the support beam. The latching means may comprise a latching hook or lug. The latching means may connect or disconnect adjacent cassettes by twisting or lifting one cassette relative to the adjacent cassette during installation of or removal of cassettes from the support beam.

Preferably a plurality of idler cassettes are mounted to the support beam, and the longitudinal profile or curvature of the elongated support beam determines the orientation of the idler cassettes and idler rollers of the cassettes relative to each other. Suitably the at least one support beam is symmetrically curved about a centre of curvature arranged centrally above the idler assembly and thus centrally of a conveyor belt supported on the idler assembly. The support beam is thus concave on its upper side such that idler rollers of the idler cassettes are arranged at an obtuse angle to each other to form a conveyor belt supported on the rollers into a symmetrical trough-like configuration. Where however the support beam is linear, the rollers of the respective cassettes supported thereon are substantially coplanar to support a substantially flat or planar conveyor belt.

Typically the support beam may support three idler cassettes comprising a central idler cassette and opposite side idler cassettes. The support beam is suitably curved or of arcuate form such that the central idler cassette and idler rollers thereof are substantially horizontal and the side idler cassettes and idler rollers thereof are inclined upwardly on opposite sides of the central idler cassette and idler rollers thereof Thus a conveyor belt supported thereon will have its central portion supported on the central idler roller substantially horizontally and its opposite side portions angled upwardly to define a trough for carrying particulate material such as coal or rock.

The support beam however may support only two idler cassettes or more than three cassettes. When the support beam supports two idler cassettes, the idler rollers of the idler cassettes may be at an obtuse angle so as to define a V-shaped support for a conveyor belt to define thereby a V-shaped trough in the conveyor belt.

The support frame suitably includes opposite end mounting means for suspending the support beam beneath a conveyor frame structure. Pivot means may be associated with at least one end mounting means for pivotally mounting at least one end of the support beam. The opposite end mounting means are suitably releasable to permit the support beam to pivot about the pivot axis of the pivot means between an operative position in which the idler cassettes support a conveyor belt and an inoperative position in which the support beam is moved away from the conveyor belt and in which cassettes may be moved endwise from or endwise onto the support beam from one end of the support beam such as from a conveyor walkway on one said of a conveyor.

Most preferably each mounting means includes pivot means, one or other of the pivot means being releasable to permit the support beam to pivot about either end away from the operative position.

The mounting means suitably comprise end mounting brackets at opposite ends of the support beam and the pivot means suitably pivotally connect each mounting bracket to a hanger bracket which may be mounted to the conveyor frame structure. The pivot connection between the mounting bracket and hanger bracket suitably defines a pivot axis extending longitudinally relative to the conveyor belt. Preferably the pivot connection is defined by a releasable pivot pins.

Suitably means are provided for limiting the pivotal movement of the support beam beyond the inoperative position. Such means may comprise a flexible element or chain fixed to and extending between an end mounting bracket and associated hanger bracket.

In another preferred aspect, the present invention provides a support frame for one or more conveyor idler cassettes, each said cassette including a cradle rotatably supporting at least one idler roll, said support frame including an elongated support beam, said cradle being adapted to be mounted to said support beam for slidable movement therealong with said roller or rollers extending longitudinally relative to said support beam, and wherein said support beam is linear or longitudinally curved to thereby determine the orientation of a roller of a said idler cassette on said beam.

In yet another preferred aspect, the present invention provides a conveyor assembly comprising a plurality of conveyor idler assemblies and a conveyor belt supported on said conveyor idler assemblies, each said idler assembly comprising a support frame, said support frame including at least one elongated linear or longitudinally curved support beam, and at least one idler cassette, said idler cassette including a cradle and an idler roller rotatably supporting on said cradle, said cradle being mounted to said support beam for slidable movement therealong.

Suitably the support frame includes mounting means for mounting opposite ends of the support beam to a conveyor frame structure such that the support beam is suspended from the frame structure. Suitably at least one mounting means has pivot means for pivotally connecting the support beam to the frame structure. The opposite end mounting means suitably is releasable to permit the support beam to pivot about the pivot means between an operative position in which idler cassettes on said beam support the conveyor belt and an inoperative position in which the support beam is spaced from the conveyor belt and in which the cassettes may be moved endwise from or endwise onto the at least one support beam from one end of the support beam.

The support beam for the cassettes may be of any cross sectional configuration for example of a T-shaped or inverted T-shaped cross section, of a V or inverted V-shape, hollow round or "clover leaf" cross section or of any other shape. The support beam may also include one or multiple rails of the above or other configurations. The term "support beam" thus as used through the specification and claims includes beams or combination of beams as referred to above or one or more beams or rails of any other cross sectional configuration. The components of the conveyor idler assembly may be constructed of metal or composite materials.

BRIEF DESCRIPTION OF THE DRAWINGS

Preferred embodiment of the invention will now be described with reference to the accompanying drawings in which:

FIG. 6 illustrates the main support beam of the conveyor idler assembly of FIGS. 1 to 4;

FIG. 7 is an underside view of a hanger bracket for the conveyor idler assembly;

FIG. 8 is an isometric view of the cradle of a conveyor idler cassette of the conveyor idler assembly;

FIGS. 9 and 10 are top and side views of the cradle of FIG. 8;

FIG. 11 illustrates the conveyor idler assembly with the main support frame lowered for idler cassette installation or removal;

FIG. 12 illustrates the manner in which a series of idler cassettes may be installed or removed from the support beam;

FIG. 13 illustrates in isometric view a conveyor idler assembly of the type illustrated in FIG. 1 but having a linear support beam;

FIG. 14 is an isometric view of an alternative conveyor idler assembly according to another embodiment of the invention;

FIG. 15 is an end view of the idler assembly of FIG. 14;

FIG. 16 is an isometric view of the support frame of the conveyor idler assembly of FIG. 14;

DETAILED DESCRIPTION OF THE PREFERRED EMBODIMENT

Figure 1:
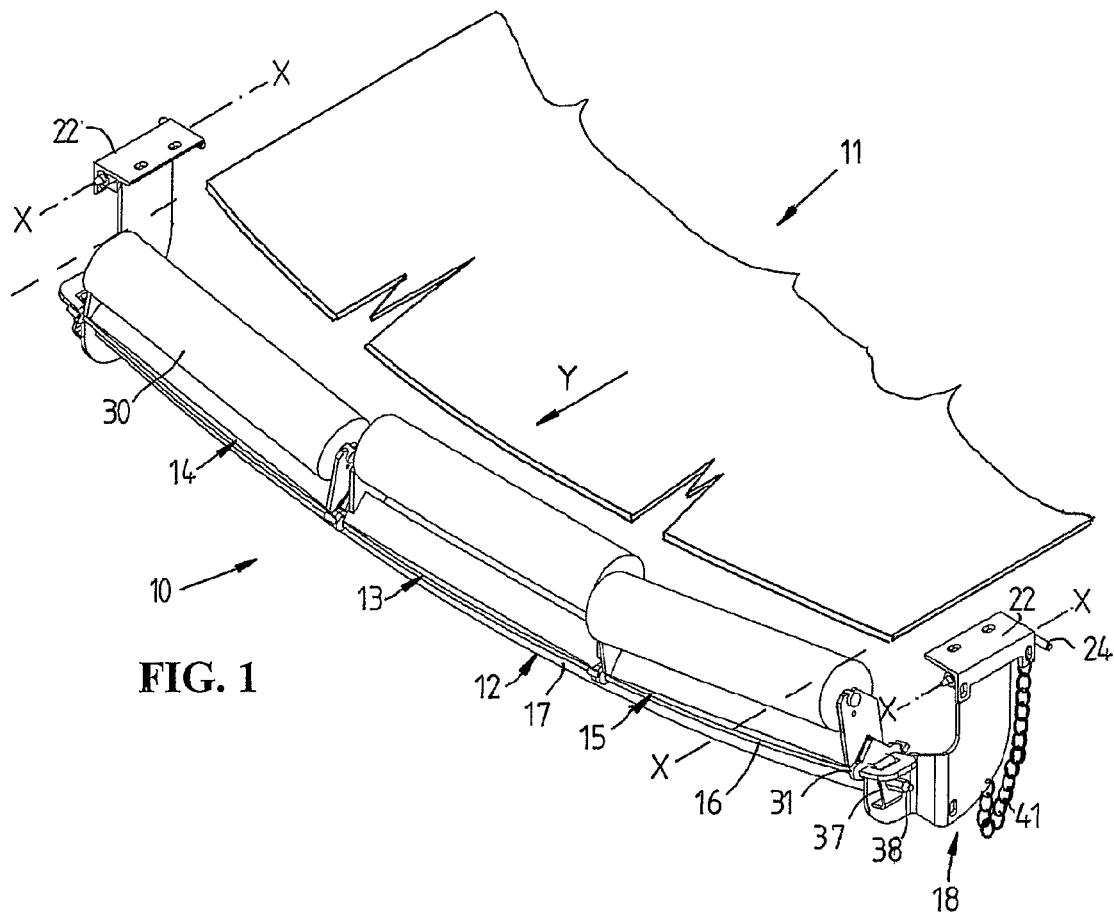
FIG. 1 illustrates in isometric view a conveyor idler assembly according to an embodiment of the present invention with an associated conveyor belt shown cut-away.

Referring to the drawings and firstly to FIGS. 1 to 4, there is illustrated a conveyor idler assembly 10 in accordance with an embodiment of the invention for supporting a conveyor belt 11 (shown cut-away), the idler assembly 10 including a support frame 12 and three conveyor idler roller cassettes comprising a central idler cassette 13 and opposite end idler cassettes 14 and 15 which are described further below. The support frame 12 as shown also in FIG. 6 includes a main elongated support member or beam 16 which comprises a thin-strip like element and which defines a track or rail for engagement by the idler roller cassettes 13, 14 and 15. The beam 16 is of a symmetrical concave curved or arcuate configuration having a radius R on a centre spaced above and positioned centrally intermediate opposite sides of the assembly 10 and belt 11 and aligned with the central longitudinal axis of the belt 11 (see FIG. 4). The beam 16 is supported on its underside by a correspondingly curved rib or strongback 17 which extends the full length of the member 16 and which is secured to the member 16 to provided support to the member 16 along its length. In cross section, the member 16 and support rib 17 are of a T-shaped configuration. The member 16 and rib 17 are typically formed of steel and interconnected by welding.

The support frame 12 additionally includes end mounting brackets 18 of J-shaped configuration and formed of metal plate. The brackets 18 have a lower connection part 19 connected to the underside of the beam 16 and to the rib 17 and an outwardly stepped leg 20 which is offset from the end of the member 16, the leg 20 terminating at its upper end in a tubular pivot mount 21. The pivot mounts 21 enable the support frame 12 to be mounted to spaced hanger brackets 22 which are mounted to a conveyor frame structure (shown in dotted outline in FIG. 4) such that the support beam 16 extends substantially at right angles to the belt 11 and is suspended beneath the conveyor frame structure by the end mounting brackets 18.

The hanger brackets 22 are of angle bracket form and provided with spaced tubular hanger members 23 (see FIG. 7) spaced apart such that the a tubular pivot mount 21 can be received therebetween. When the tubular pivot mount 21 is aligned with the hanger members 23 of a bracket 22, a detachable pivot pin 24 can be inserted through the members 23 and mount 21 to define a pivot axis X-X which is substantially at right angles to the beam or member 16. Similar pivot connections are provided in this embodiment at each end of the support frame 12 and allow one or the other of the mounting brackets 18 to be disconnected from its associated hanger bracket 22 and permit the support beam 16 and conveyor idler cassettes 13, 14 and 15 mounted thereon to be pivoted downwardly about a hinge axis X-X at one or the other end of the support frame 12 which facilitates service to the conveyor idler assembly or replacement, changing or repair of idler roller cassettes 13, 14 and 15 from one side of the support frame 12 as described further below.

The idler roller cassettes 13, 14 and 15 are of substantially identical configuration and thus only the cassette 13 will be described. As shown in FIGS. 8 to 10, the cassette 13 has a cradle comprising a main elongated mounting member 25 which is of a V-shaped cross section and typically comprising angle iron with the apex 26 of the member 25 being uppermost with the opposite flanges 24 of the member 21 being inclined outwardly from the apex 26 on opposite sides. A pair of end roller mounting brackets 27 are secured to the member 25 adjacent opposite ends thereof to extend upwardly from the apex 26 of the member 25. The end mounting brackets 27 have slots 28 in which respective opposite ends of a roller shaft or spindle 29 which supports an idler roller 30 can be received. Spring-loaded end plates or other securing arrangement may be provided to secure the shaft 29 to each end bracket 27. It will be noted in FIG. 10 that the apex 26 of the V-shaped mounting member 25 is adjacent to and below the periphery of the roller 30 and extends substantially parallel thereto. The shaft receiving slots 28 of the mounting brackets 27 however are offset relative to the longitudinal centreline of the member 25 to thereby offset the shaft 29 and roller 30 relative to the longitudinal centreline of the member 25 as is apparent in FIG. 9.

A pair of slide brackets 31 are secured to opposite ends of the member 25 on the lower side of the member 25. Each bracket 31 is formed with a C-shaped re-entrant recess 32 of a similar cross section to, and complementary to the beam or member 16 so as to be capable of receiving the beam 16 to capture the idler roller cassette 13 to the beam 16 but allow sliding movement therealong. The bracket 31 include opposed inwardly directed fingers 33 which define the recess 32 and which are adapted to locate on the underside of the beam 16 at each end of the cassette 13 to retain the brackets 31 and thus the cassette 13 to the beam 16. The brackets 31 whilst extending substantially parallel to each other transversely of the member 25 are angled at an obtuse angle to each other in a vertical longitudinally extending plane to allow for abutment between brackets 31 of adjacent cassettes 13 on a curved beam 16.

Each bracket 31 also carries a hook-like latching lug 34 with the lug 34 of one bracket 31 being on the opposite side to the lug 34 on the opposite end bracket 41. The lug 34 on one bracket 31 can hook over the adjacent bracket 31 of an adjacent cassette 14 (or 15) to interlock adjacent cassettes 13, 14 and 15 in an end-to-end relationship. The lugs 34 of one cassette 13 may be disconnected from engagement with a bracket 31 of an adjacent cassette 14 (or 15) and vice-versa by twisting one cassette 13 relative to the adjacent cassette 14 (or 15) when being removed from or being installed onto the beam 16. This will therefore disconnect adjacent cassettes 13 and 14 (or 15). The lugs 34 however enable all cassettes 13, 14 and 15 on the beam 16 to be interconnected and slid as one along the beam 16.

Figure 5:
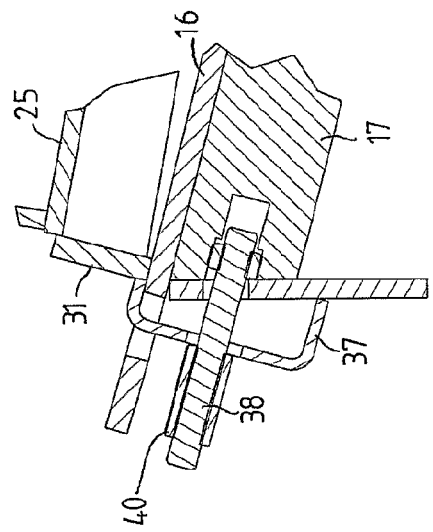
FIG. 5 is an enlarged sectional view along line A-A of FIG. 2 showing the idler cassette clamp.

To hold cassettes 13, 14 and 15 in a fixed position along the beam 16, the beam 16 is provided with slots 36 at each end through which a U-shaped end clamping member 37 (see also FIG. 5) may project to abut against the adjacent slide bracket 31. The clamping member 36 is releasably held in position by means of a clamp stud 38 captured freely to an end of the support frame 12, the clamp stud 38 extending through an opening 39 in the clamping member 37 and cooperating with a nut 40 which can be tightened to clamp the member 37 in position against a bracket 31.

A chain 41 or other flexible element is connected between the hanger bracket 22 and mounting bracket 18 to take the weight of the end of the support frame 12 and idler cassettes 13, 14 and 15 when lowered as described below.

In the operative position of FIG. 1 to 4, three idler cassettes 13, 14 and 15 are mounted to the beam 16 to support the conveyor belt 11. One of the cassettes 13 is positioned centrally of the beam 16 whilst the other two cassettes 14 and 15 comprise left and right hand side cassettes located on the opposite sides of the central cassette 13. It will be apparent the belt 11 supported on the rollers 30 of the respective cassettes 13, 14 and 15 will be formed into a trough-shaped configuration in cross section due to the upwardly inclined orientation of the side cassettes 14 and 15 as defined by the longitudinal curvature in the beam 14.

Figure 2:
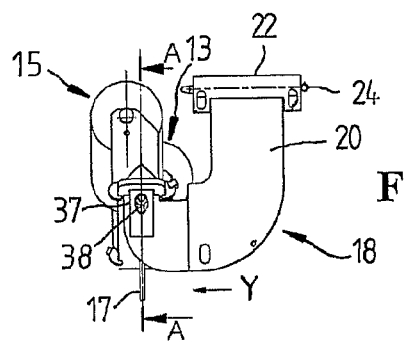
FIGS. 2, 3 and 4 are end, top and side views of the conveyor idler assembly of FIG. 1.
Figure 3:
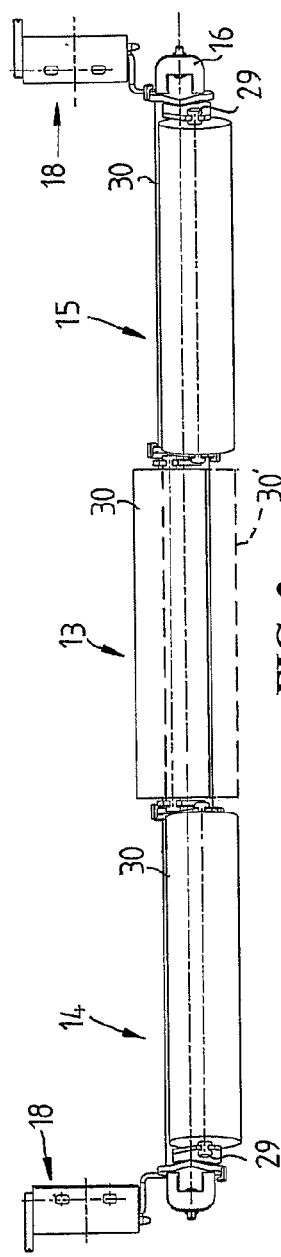
Figure 4:
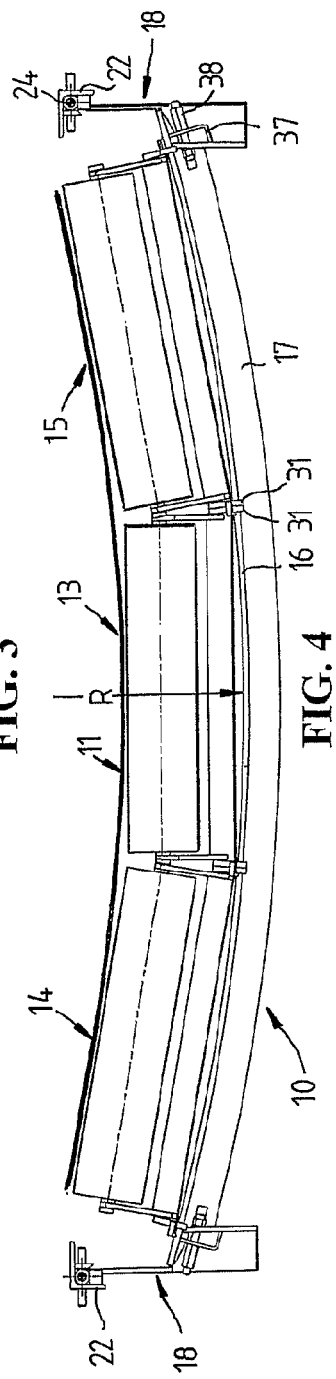

Further as illustrated, the left and right hand cassettes 14 and 15 are transversely aligned whilst the central cassette 13 is offset rearwardly from the side cassettes 14 and 15 relative to the direction of movement of the belt 11 indicated by the arrow Y in FIGS. 1 and 2. After the cassettes 13, 14 and 15 are positioned on the beam 16, the end clamping members 37 are applied to the opposite ends of the beam 16 hold the cassettes 13, 14 and 15 in end-to-end relationship with each other. In addition, the end brackets 31 of the respective members 25 of adjacent cassettes 13, 14 and 15 substantially abut and mate with each other as shown in FIG. 4 so that the members 25 form a substantially continuous barrier along the beam 16 which reduces the possibility of any material or debris dropping from the conveyor belt 11 passing between the cassettes 13, 14 and 15. If the cassettes 13, 14 and 15 are to be used on a beam 16 with a different curvature, the brackets 31 of the cassette members 25 are adjusted in angle so as to enable them to abut. The outwardly inclined surfaces 24 of the members 25 further act as ramps or deflectors to guide any material dropping from the belt 11 away from and outwardly of the cassettes 13, 14 and 15.

Where an idler cassette 13, 14 or 15 is to be replaced or serviced, a hand operated chain winch 42 (known as a cumalong) is connected between the hanger bracket 22 and mounting bracket 18 and operated to tension the chain 43 to take the weight of the end of the support frame 12 which allows the pivot pin 24 to be detached to release that end of the support frame 12. The winch 42 may then be further operated to lower the released end of the support frame 12 which pivots about the opposite pivot pin 24 until the chain 41 becomes tensioned and takes the weight of the frame 12 as shown in FIG. 11. This procedure can all be carried out by a single workman on a walkway on one side of the conveyor and when the belt 11 is moving and thus the workman is not exposed to danger.

Further as the mounting brackets 18 are stepped outwardly from the opposite ends of the cassette support beam 16, a workman in releasing a pivot pin 24 and lowering and raising the frame 12 and removing or replacing cassettes is not exposed to the hazardous area beneath the idler assembly 10.

After the support frame 12 and thus beam 16 is lowered, the clamping member 37 can be removed by undoing the clamping nut 39 and the idler cassettes 15, 13 and 14 can be slid endwise from the lowered end of the beam 16 as illustrated in FIG. 12. Because the cassettes 13, 14 and 15 are releasably interconnected by the connecting lugs 34, as the cassette 15 is slid from the beam 16, the other cassettes 13 and 14 are also pulled along the beam. To release the lugs 34, the leading cassette 15 is twisted slightly in the direction Z as it is withdrawn from the end of the beam 16 to disconnect it from the adjacent cassette 13 and this procedure is repeated for the next cassette.

For installation, an idler cassette 13, 14 or 15 may be slid endwise onto the beam 16 from one end thereof by positioning the respective brackets 31 of the cassettes 13, 14 and 15 such that the beam 16 may be received in the recesses 32 of the brackets 31. When the beam 16 is located in the recesses 32, the cassette 13, 14 or 15 is captured to the beam 16 but is capable of longitudinal sliding movement along the beam 16 so that it can be positioned where required along the beam 16. Each subsequent cassette is slightly twisted prior to installation to enable the respective cassettes to be interconnected through the lugs or hooks 34. After installation, the cassettes 14, 15 and 16 may be held in position by the clamping members 37.

Whilst the cassettes 13, 14 and 15 are shown with the central cassette 13 offset from the side cassettes 14 and 15 in FIGS. 1 to 4, the orientation of the central cassette 13 may be reversed so that its roller offset is on the same side as the roller offsets of the opposite end cassettes 14 and 15. Thus all rollers 30 of the cassettes 14 and 15 will be longitudinally aligned as shown in dotted outline in FIG. 3. Alternatively the end cassettes 14 and 15 can be reversed to align their rollers 30 with the roller 30 of the central cassette 13.

The curvature of the profile of the rail-like beam 16 may be varied to suit the application so that the orientation of the cassettes 13, 14 and 15 supported on the beam 16 may be varied. Thus an increase concavity in the beam 16 will result in a deeper trough in a belt 11 supported on the cassettes 13, 14 and 15.

The idler assembly 10' of FIG. 13 is substantially the same as the assembly 10 except that the beam 16 and rib 17 are of a linear form so that the rollers 30 of cassettes 13, 14 and 15 supported thereon are substantially coplanar but are installed and removed in the same manner as described above.

The conveyor idler assembly of the present invention may in most cases be fitted to exiting mounting points as used for conventional idler assemblies and respective cassettes 13, 14 and 15 may be installed in a single person operation from one side of the conveyor belt 11. Replacement of idler cassettes 13, 14 or 15 also removes the need to use safety harnesses at heights and the need to lie under the return strand of the conveyor belt to change return idlers on ground mounted structures. In addition, there is no need to lie inside conveyor structures to replace cassette idlers. Further idler rollers can be replaced without the need to raise the belt 11 and further whilst the belt 11 is moving. The mounts for the conveyor idler assembly may be varied to suit the location of an assembly within a conveyor structure. The mounting of the idler cassettes when assembled with its support frame renders the cassettes and rollers thereof much less prone to damage during transportation.

The cassettes 13, 14 and 15 although showing the rollers 30 offset from the central longitudinal axis of the main support member 25, may have the rollers 30 aligned with that axis. The members 25 of the cassettes 13, 14 and 15 may be varied in design and different end mounting brackets may be provided for supporting the roller shafts 29. Whilst the beam 16 is supported by the bracing rib 17 on its underside, to reduce overall height, the rib 17 may be provided on the upper side of the beam 16. The brackets 30 may be varied for example by being provided with slots to accommodate the rib 17 on the upper side of the beam 16. The rail-like beam 16 may be in other configurations than that described and illustrated. The brackets 31 may also be varied in configuration and replaced for example by angle brackets on opposite sides of the member 25. The member 25 may also be in configurations other than the V-shaped configuration described. The clamping members 37 may also be in various configurations but the clamping members 37 are suitably designed so that the idler cassettes 13, 14 and 15 are held firmly in end-to-end abutment with each other when clamped at each end.

Referring now to FIGS. 14 and 15, there is illustrated a conveyor idler assembly 43 in accordance with another embodiment of the invention which is used for low profile applications. The assembly 43 includes a support frame 44 which carries three idler cassettes 45, the support frame 44 having end mounting brackets 46 at each end by which the frame 44 can be suspended from a conveyor frame structure via hanger brackets 47 in a similar manner to the previously described embodiments. The end brackets 46 are connected to hanger brackets 47 through releasable pivot connection 48 similar to that previously described which allows one or other end of the frame 44 to be released and pivotally lowered for replacement and instalment of the idler cassettes 45. The support frame 44 in this case includes a pair of parallel arcuate rails 49 (see FIG. 6) which are fixed to and extend between the end brackets 46. The rails 49 are of angle section form in cross section and have a symmetrical curved concave configuration in longitudinal profile. One flange 50 of each rail 49 is substantially horizontal and directed inwardly to oppose the other flange 50.

Figure 17:
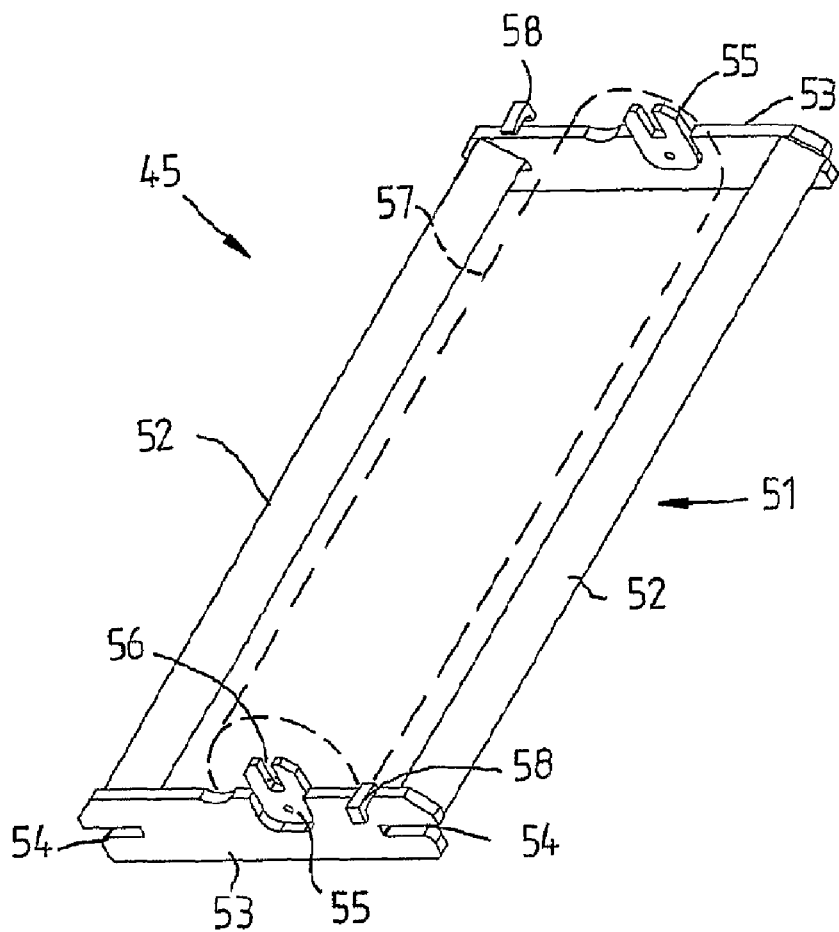
FIG. 17 is an isometric view of a roller cradle of a cassette for use with the idler assembly of FIG. 14.
Figure 18:
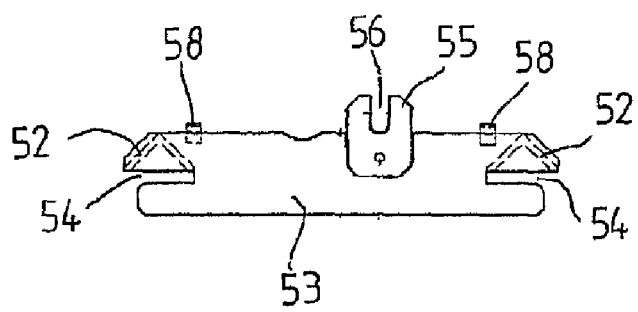
FIG. 18 is an end view of the roller cradle of the cassette of FIG. 17.

As shown in FIGS. 17 and 18, each idler cassette 45 comprises a roller cradle 51 having a pair of parallel side cradle members 52 of angle section form and pair of parallel end cradle members 53 connected to the side cradle members 52. Slots 54 extend inwardly from opposite lateral sides of the cradle members 53, the slots 54 being complementary to the flanges 50. A pair of upstanding end roller mounting lugs 55 are secured to the end cradle members 53 respectively at a position offset from the longitudinal central axis of the cradle 51. The lugs 55 are provided with slots 56 in which respective opposite ends of a roller shaft or spindle 56 which supports an idler roller 57 can be received. Any suitably releasable securing arrangement may be provided to secure the shaft 56 to each lug 55.

Each end cradle member 53 also carries a hook-like lug 58 with the lug 58 of one member 53 being on the opposite side to the lug 58 on the opposite member 53. The lug 58 on one member 53 can hook over the adjacent member 53 of an adjacent cassette 45 to releasably interlock adjacent cassettes 45 in an end-to-end relationship.

For installation, an idler cassette 45 is positioned to align the slots 54 with the respective rail flanges 50 and the cassette 45 may then be slid endwise onto the rails 49 such that it is captured to the frame 44 but is capable of longitudinal sliding movement. Each subsequent cassette 45 is slightly lifted upwardly relative to the preceding cassette 45 whose end projects outwardly of the rails 49 to enable the hook or lug 58 of the trailing cassette 45 to be hooked over the member 53 of the leading cassettes 45 which interconnects the cassettes 45 and allow them to be moved as one when installed on the rails 49. The cradles 51 as in the preceding embodiments cannot be disconnected from each other when engaged with the rails 49. After installation, the cassettes 45 may be held in position by clamps 59 similar to the clamp 37 of FIG. 5.

Respective cassettes 45 may be positioned as shown in FIG. 14 so that the roller 57 of the central cassette 45 is offset from the rollers 57 of the opposite side cassettes 45 however the orientation of the central cassette 45 may be reversed so that its roller 57 is aligned with the rollers 57 of the other cassettes 45. Alternatively the end cassettes 45 can be reversed to align with the central cassette 45.

Cassettes 45 may be removed and/or replaced in the same manner as described with reference to FIGS. 11 and 12 with one end of the support frame 44 being lowered to allow sliding of cassettes 45 in turn from the rails 49 from one side of the conveyor. Cassettes 45 are installed in a reverse manner as described above.

Figures 19, 20:
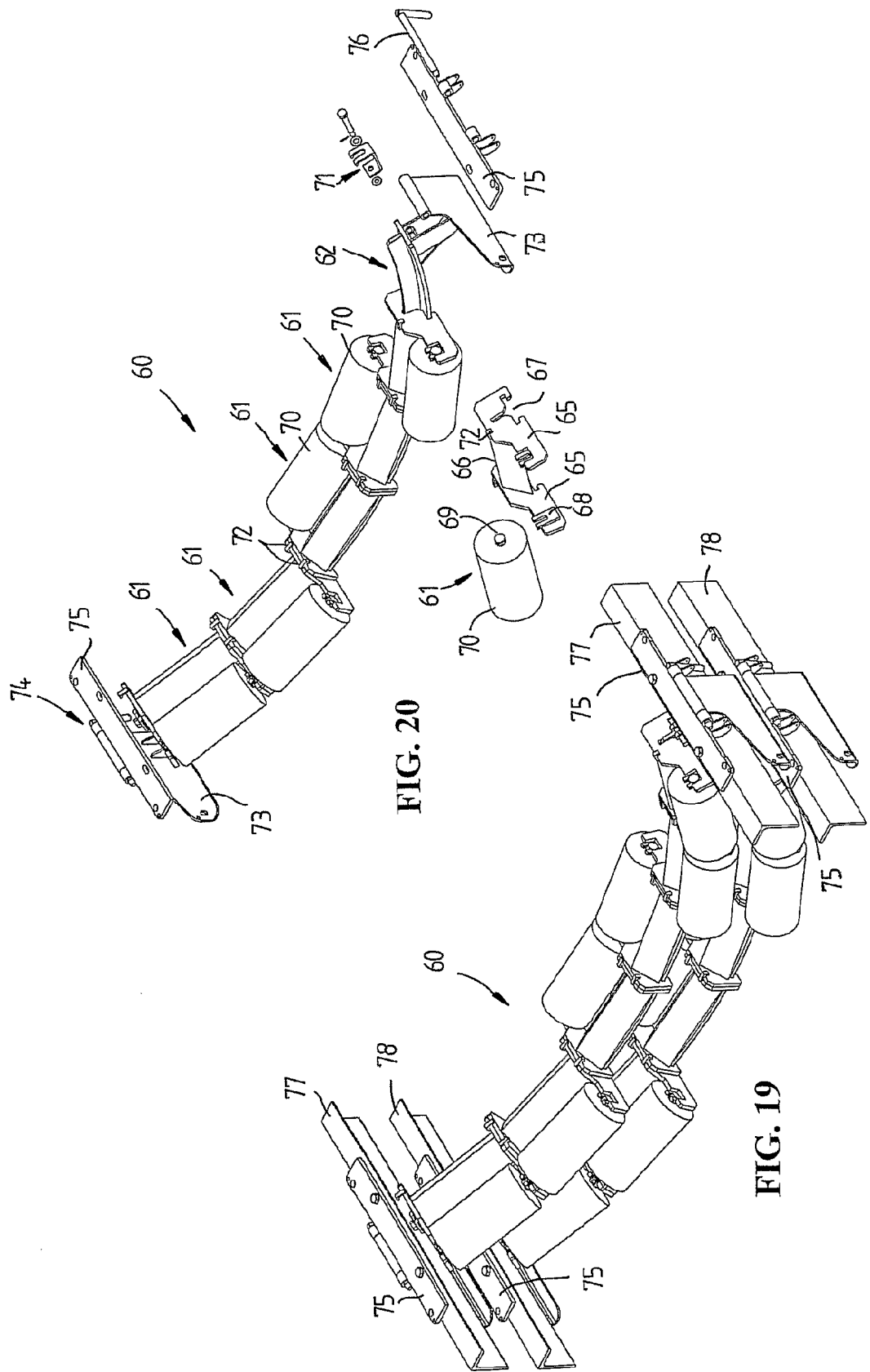
FIG. 19 is an isometric view of a pair of conveyor idler assemblies according to another embodiment of the invention.
FIG. 20 is an exploded view of one idler assembly of FIG. 19.

FIGS. 19 illustrate a pair of alternative conveyor idler assemblies 60 according to the invention which are particularly applicable to a ship loading conveyor assembly comprising one conveyor which can be extended from another conveyor. Each idler assembly 60 as also shown in FIG. 20 includes six idler cassettes 61 supported slidably on an elongated arcuate support beam 62 which in this case is of an inverted T-shaped cross section. Each cassette 61 includes a cradle 64 having end cradle members 65 secured to opposite ends of a main frame member 66 which is of an inverted V-shaped cross section. The cradle members 65 are provided with re-entrant recesses 67 which are aligned with the inverted V-shaped member 66 and which are similar shape to the cross section of the beam 62. This enables the cradle 64 to be slid endwise onto the beam 62 which will be captured in the recesses 67. The cradle members 65 extend to one side of the frame member 66 and have mounts 68 to receive opposite ends of a spindle 69 of an idler roller 70 which position the idler rollers 70 in use laterally of the beam 62. Clamping assemblies 71 are provided at opposite ends of the beam 62 for clamping the cassettes 61 in position when located on the beam 62. As with the previous embodiments, latch like-lugs or hooks 72 are provided on the cradle members 65 to hook over the adjacent cradle member 65 of an adjacent cassette 61 during installation on the beam 62 to interconnect the cassettes 61 end-to end when on the beam 62.

Opposite ends of the beam 62 are connected to mounting brackets 73 which are spaced outwardly of the ends of the beam 62, the mounting brackets 73 being provided with pivot mounts 74 for pivotally connecting the brackets 73 to hanger brackets 75 via releasable pivot pins 76. The hanger brackets 75 are mounted to respective frame members 77 and 78 of conveyor structures, the lower frame members 78 being mounted for movement longitudinally relative to the upper frame members 77.

As with the previous embodiments, the pin 76 on one side of the beam 62 may be released to allow the beam 62 carrying the cassettes 61 to be pivoted downwardly about the opposite pivot pin 76 to allow removal or replacement of the cassettes 61 which may be slid endwise from or endwise onto the beam 62 after removal of the clamps 71. Of course to permit pivoting movement of the beam 62 of the upper idler assembly 60, it is necessary to move the upper and lower idler assemblies 60 out of vertical alignment with each other by sliding one set of frame members 78 relative to the other set 77.

As shown in the drawings, the central two cassettes 61 have their rollers 70 on one side of the beam 62 whilst the other end cassettes 61 have their rollers on the opposite side of the beam 62. The central cassettes 61 however may be reversed so that all rollers 70 are aligned transversely of a conveyor belt supported on the rollers 70.

Whilst the embodiment of FIGS. 18 and 19 shows an idler assembly 60 with six idler cassettes, any of the idler assemblies described above may have any number of cassettes.

The reference to prior art in the above description is not to be taken as an admission that the prior art constitutes common general knowledge in the art.

The terms "comprising" or "comprise" or derivatives thereof as used throughout the specification and claims are taken to specify the presence of the stated features, integers and components referred to but not preclude the presence or addition of one or more other feature/s, integer/s, component/s or group thereof.

The invention claimed is:

1. A conveyor idler assembly for supporting a conveyor belt, said idler assembly comprising a support frame, said support frame including at least one elongated longitudinally curved support beam, and a plurality of idler cassettes, each said idler cassette including a cradle and an idler roller rotatably supported on said cradle, said cradle being mounted to said support beam for slidable movement therealong, and wherein the curvature of said support beam determines the orientation of said rollers of respective idler cassettes relative to each other and thereby the cross sectional profile of a said conveyor belt supported by said rollers.

2. A conveyor idler assembly as claimed in claim 1 wherein each said cradle includes longitudinally spaced beam engagement means, said beam engagement means capturing said cradle to said beam and permitting longitudinal sliding movement of said cradle relative to said beam whereby said cradles may be installed endwise onto, or removed endwise from, an end of said support beam.

3. A conveyor idler assembly as claimed in claim 1 wherein each said cassette comprises a main elongated support member and end mounts for receiving opposite ends of a shaft or spindle of said idler roller, said elongated support member being of an inverted V-shaped cross section and wherein the apex of said V- is adjacent to the periphery of said roller and extends substantially parallel thereto.

4. A conveyor idler assembly as claimed in claim 1 wherein said at least one support beam comprises a thin elongated rail and elongated stiffening means for stiffening said rail.

5. A conveyor idler assembly as claimed in claim 4 wherein said beam is of a T-shaped cross section.

6. A conveyor idler assembly as claimed in claim 1 wherein said at least one support beam comprises a pair of spaced parallel rails, said cradle of each said idler cassette including end cradle members adapted to cooperate with said rails for slidable movement therealong, and wherein said roller is supported at opposite ends to said end cradle members respectively and is adapted to be located between said rails.

7. A conveyor idler assembly as claimed claim 1 wherein said cradle of each said idler cassette has a central longitudinal axis and wherein said roller is offset from said central axis.

8. A conveyor idler assembly as claimed in claim 1 wherein said roller is offset to one side of the at least one support beam.

9. A conveyor idler assembly as claimed in claim 7 wherein respective cassettes having said offset rollers are adapted to be mounted on said support beam such that a roller of one cassette is offset from, or aligned with, a roller of a further said cassette supported on said beam.

10. A conveyor idler assembly as claimed in claim 1 including latching means adapted to releasably interconnect a cradle of one said cassette to the cradle of an adjacent cassette whereby a plurality of interconnected cassettes on said support beam can be moved together along said support beam.

11. A conveyor idler assembly as claimed in claim 10 wherein said latching means comprises a latching member on one said cradle adapted to cooperate with an adjacent said cradle to interconnected adjacent said cradles, and wherein twisting or lifting of one said cradle relative to the adjacent said cradle disconnects said latching means of adjacent said cradles.

12. A conveyor idler assembly as claimed in claim 1 wherein said at least one support beam is symmetrically curved in the longitudinal direction relative to the direction of movement of said conveyor belt supported in use by said idler assembly whereby the idler rollers of said idler cassettes are arranged at an obtuse angle to each other to form said conveyor belt supported on said rollers into a trough-like configuration.

13. A conveyor assembly as claimed in claim 1 wherein said support frame includes opposite end mounting means for suspending said support beam beneath a conveyor frame structure.

14. A conveyor assembly as claimed in claim 13 and including pivot means associated with at least one said end mounting means for pivotally mounting at least one said end of said support beam, and wherein the opposite end mounting means is releasable to permit said support beam and idler cassettes supported thereon to pivot about said pivot means between an operative position in which said idler cassettes support a said conveyor belt and an inoperative position in which said support beam is moved away from said conveyor belt and in which said cassettes may be moved endwise from or endwise onto said at least one support beam from one end of said support beam.

15. A conveyor assembly as claimed in claim 14 wherein each said mounting means includes pivot means, one or other of the said pivot means being releasable to permit said support beam to pivot about one or the other said pivot means away from said operative position.

16. A conveyor assembly as claimed in claim 14 and including means interconnecting said beam and said frame structure for limiting said pivotal movement of said support beam beyond said inoperative position.

17. A support frame for one or more conveyor idler cassettes, each said cassette including a cradle rotatably supporting at least one idler roll, said support frame including an elongated support beam, said one or more cassettes being adapted to be mounted to said support beam for slidable movement therealong with said roller or rollers extending longitudinally relative to said support beam, and wherein said support beam is longitudinally curved to thereby determine the orientation of said roller of a said idler cassette on said support beam.

18. A conveyor assembly comprising a plurality of conveyor idler assemblies and a conveyor belt supported on said conveyor idler assemblies, each said idler assembly comprising a support frame, said support frame including at least one elongated longitudinally curved support beam, and at least one idler cassette, said idler cassette including a cradle and an idler roller rotatably supporting on said cradle, said cradle being mounted to said support beam for slidable movement therealong and wherein the curvature of said support beam defines the orientation of said roller of said cassette.

19. A conveyor assembly as claimed in claim 18 wherein each said conveyor idler assembly includes a plurality of idler cassettes and wherein the curvature of said support beam defines the orientation of rollers of respective cassettes relative to each other and the transverse profile of said conveyor belt supported on said rollers.

20. A conveyor assembly as claimed in claim 19 wherein said support frame includes mounting means for mounting opposite ends of said support beam to a conveyor frame structure such that said support beam is suspended from said frame structure, at least one mounting means having pivot means for pivotally mounting said support beam to said frame structure, and wherein the opposite end mounting means is releasable to permit said support beam to pivot about said pivot means from an operative position in which idler cassettes support said conveyor belt, to an inoperative position in which said support beam is moved away from said conveyor belt and in which said cassettes may be moved endwise from or endwise onto said at least one support beam from said one end of said support beam.

* * * * *